UNITED STATES PATENT OFFICE.

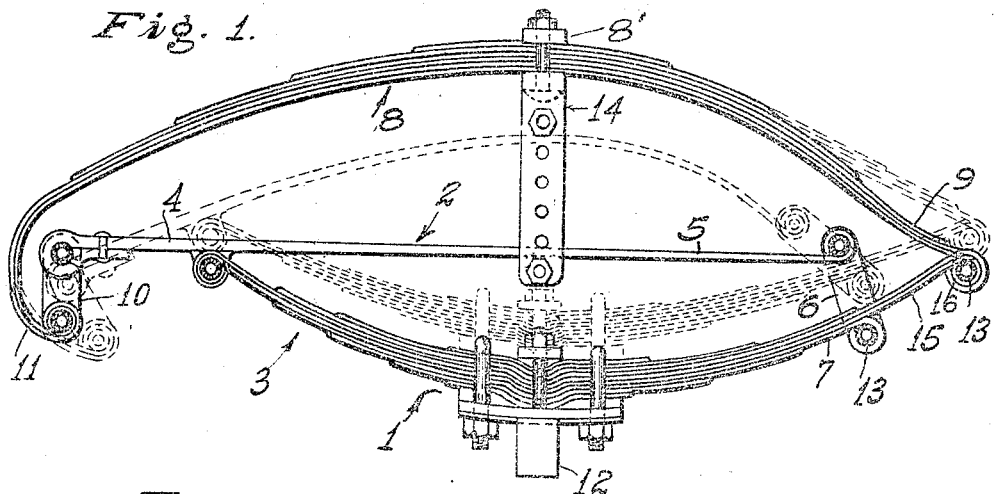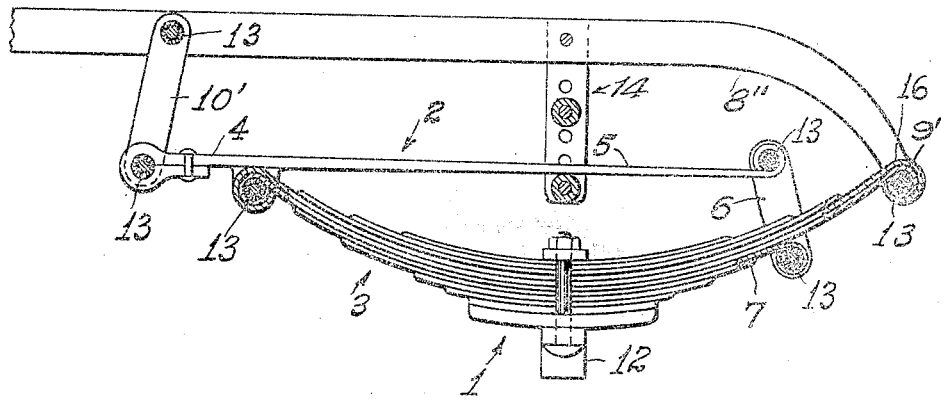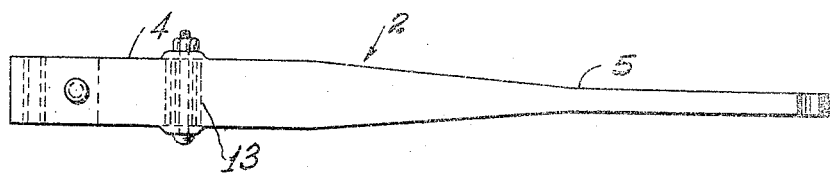

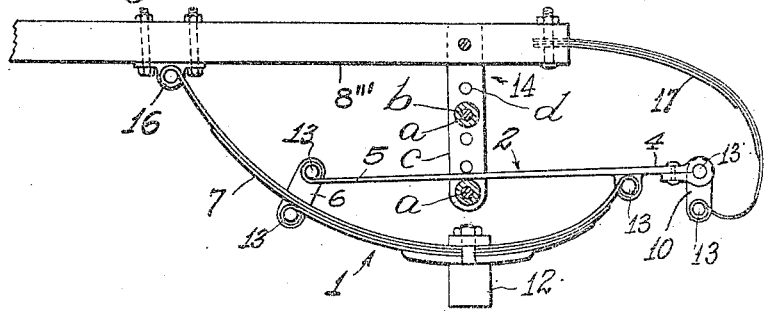
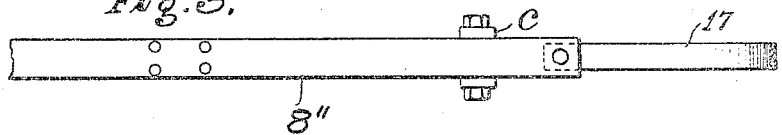
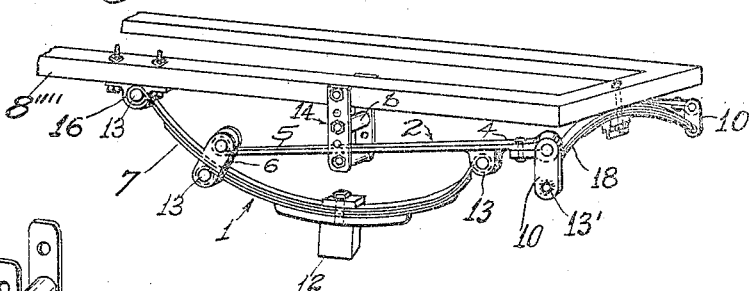
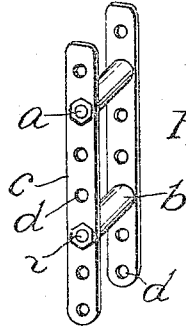
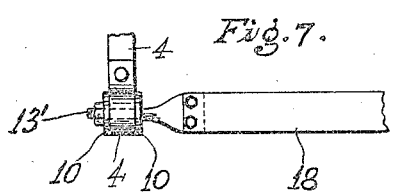

PERCIVAL L. ROOKLEDGE AND GEORGE W. GILLESPIE, OF CAMBRIA, CALIFORNIA; SAID GILLESPIE ASSIGNOR TO SAID ROOKLEDGE.

VEHICLE-SPRING.

1,110,826.  Specification of Letters Patent. Patented Sept. 15, 1914.

Application filed September 25, 1911. Serial No. 651,287.

*To all whom it may concern:*

Be it known that we, PERCIVAL L. ROOKLEDGE and GEORGE W. GILLESPIE, both citizens of the United States, residing at Cambria, in the county of San Luis Obispo and State of California, have invented a new and useful Vehicle-Spring, of which the following is a specification.

This application is designed to cover features of invention divided out of our application Serial No. 594,985, filed November 30, 1910, and certain improvements thereof.

An object of the invention is to provide a superior spring affording gently yielding resilient support for heavy and light loads alike; the resistance of the spring increasing and decreasing as the burden of the load increases and decreases.

A further object is to provide a vehicle spring in which the amplitude of movement is limited by resilient means, to make adjustable the limits of unrestricted movement, and to provide means whereby the resistance offered by the spring at the close of its distortion and recoil or of either, may be regulated.

Another object is to reduce the liability of breakage of any elliptic or semi-elliptic spring by supplementing the same with a resilient element that at all times serves as a stay for the usual parts of such spring, and to provide means to obstruct such stay and apply its resilient force more or less forcibly as desired under different working requirements and conditions.

The invention is applicable to various forms of vehicles, but is more particulary applicable as a shock absorber for automobiles.

The accompanying drawings illustrate the invention.

Figure 1 is a side elevation partly in section of the invention as including a full elliptic spring and constructed in accordance with this invention and adapted for use in an automobile, only parts of which are shown. Dotted lines indicate a possible position of parts as the wheels of the automobile suddenly rise toward a heavily loaded automobile body not shown, in going over an obstruction. Fig. 2 is a side elevation partly in section of the invention as applied in the form in which a half elliptic spring supports an upper non-resilient body. Fig. 3 is a plan of the spring lever. Fig. 4 is a view in which a three-fourths elliptic spring is employed and in which the chassis and the upper quarter elliptic spring constitute the equivalent of the upper half elliptic spring shown in Fig. 1. Fig. 5 is a plan of the device shown in Fig. 4. Fig. 6 is a view of another embodiment of the invention. Fig. 7 is a fragmental plan detail of parts shown in Fig. 6. Fig. 8 is a perspective view of the duplex bumper detached.

In the drawings like characters designate similar parts: indices being added to some of such characters to avoid confusion with reference to parts that are not wholly similar.

In Fig. 1 there is shown the combination with a half-elliptic spring 1, of a lever spring 2 fulcrumed to one end 3 of the half-elliptic spring and having a short arm 4 and a long arm 5: the long arm being resilient; a shackle 6 connecting the end of the long arm with the other end 7 of the half-elliptic spring: a supported body in the form of a second half-elliptic spring 8 connected at one end 9 with the same end 7 of the half-elliptic spring 1 as the lever arm 5 and a shackle 10 connecting the short arm 4 of the lever spring 2 with the other end 11 of the second half-elliptic spring 8.

12 represents a supporting body as an axle of the vehicle which is resiliently connected through the half-elliptic spring 1 and lever spring 2 and their shackles with a supported body which may in some instances be resilient and in other instances be non-resilient.

In Fig. 1 the second half-elliptic spring 8 constitutes the resilient supported body, and it in turn supports the chassis body 8'.

In Fig. 2 the supported body 8'' is the chassis body of the vehicle.

In Fig. 1 the end 11 of the upper half-elliptic spring 8 is bent downwardly underneath the end of the arm 4 so that the shackle 10 may swing beneath such arm.

In Fig. 2 the shackle 10' is swung from a supported body in the form of a chassis 8'' and is pivotally connected with the short arm 4 of the lever spring.

All of the pivotal connections shown in either of the views are made by pins and roller bearings 13 and the long resilient arm 5 is sufficiently limber to contact with the supported body or a bumper 14. In some cases no bumper is provided and consequently the limber arm 5 under heavy loads way in such cases come into contact directly with the chassis body 8″.

The shackle 6 may be connected with the end 7 of the half-elliptic spring 1 at a variable distance from the tip 16 of said spring end 7 that is connected to the chassis 8″ or to the end 9 of the upper half elliptic spring.

The shackles may be of any desired construction and are shown as pairs of rigid swinging links pivotally connected at their ends with the parts to be connected.

In Fig. 4 a body having a spring member in the form of a quarter elliptic spring 17 is fastened to the chassis 8‴ and the shackle 10 is connected therewith by a bearing 13.

In Figs. 6 and 7 the spring 18 is provided at its end with a bearing pin 13′ for pivotal connection with the shackle 10.

In practical use when the resilient arm 2 under strain or pressure comes up against bumper 14 in Fig. 1 thus introducing into action a shorter lever between the bumper and the fulcruming spring end 3, and when all the resiliency of this part of the lever is taken up the action of the whole spring comes into play.

Pressure or weight on the top spring in the case of a full elliptic spring or on the body of the car in the case of a half or three-quarters elliptic spring, causes the lever to bow upward until it engages the bumper; and after the limb 2 engages the bumper and before the car can compress the springs further, it is necessary for the arm 2 to straighten out; and in doing so the lever has a tendency to elevate the arm 4 of the spring so that the full strength of the spring is brought into play.

The operation of the spring is apparent from the foregoing description and is practically the same with all the forms shown.

An adjustable arrangement of bumpers is shown in Figs. 1, 2, 4 and 6, there being an upper and lower bumper provided for the lever spring in each of these cases. Said bumpers comprise bolts a and rubber sleeves b therefor forming stops, said bolts being supported by hangers c which are similarly provided with a plurality of bolt holes d, so that by adjusting the bolts a or either of them to a higher or lower level various effects may be produced upon the spring lever 2, said lever being intercepted by the bumpers at an earlier or later stage in compression of the spring. Said bolts may be covered with rubber or other suitable material to prevent noise and may be adjusted relatively, toward and from each other and to various places up and down the hangers. The lower bumper is preferably placed in contact with the under surface of the lever spring when the car is resting and unloaded.

By having the bumpers adjustable as shown it is possible to get as much action of the levers as one wishes.

In action when the axle rises and the spring compresses, the lever spring leaves the lower bumper and begins to act and continues in action with increasing resistance as the long arm 5 contacts with the upper bumper, but when the car rebounds the lower bumper contacts with the lever and the lever is thereby pulled up as will be readily understood, thereby resisting the upthrow, and at the same time the outer end of the short arm will be forced downward, in this way tending to lower the car body, thus compensating for the upthrow.

When the car body comes down or the spring compresses until the upper bumper engages the lever any further compression will tend to depress the long arm of the lever and at the same time raise the outer end of the short arm, in this way resisting and compensating for further downward action.

In constructing the spring enough room will be left between the lower bumper and the lower spring member to allow for the normal action of the spring without contact between such bumper and the lower spring. It is thus seen that the lever spring is fulcrumed between the supporting and the supported body, as the axle or the lower half elliptic spring and the chassis, and that the duplex bumper contacts with the lever spring at parts of the approaching and separating movements of the supporting and the supported body and that leverage and resilient action are effective at the entreme movements or reverse limits of the spring action in both directions to oppose such extreme movements.

We claim—

1. The combination with a half elliptic spring, of a lever spring fulcrumed to one end of the half elliptic spring, and having a short and a long arm; the long arm being resilient; a shackle connecting the end of the long arm with the other end of the half elliptic spring; a second half elliptic spring connected at one end with the same end of the half elliptic spring as the resilient arm, and a shackle connecting the short arm of the lever spring with the other end of the second half elliptic spring.

2. The combination with a half elliptic spring, of a lever spring fulcrumed to one end of the half elliptic spring and having a short and a long arm; the long arm being resilient; a shackle connecting the free end of the long arm with the other end of the half elliptic spring; another half elliptic spring connected at one end with the same end of the first half elliptic spring as the resilient arm; a shackle connecting the short arm of the lever spring with the other end of the second half elliptic spring, and a vertically adjustable bumper to contact with the resilient arm of the lever spring.

3. The combination with a half elliptic spring, of a lever spring fulcrumed to one end of the half elliptic spring, and having a short and a long arm; the long arm being resilient; a shackle connecting the end of the long arm with the other end of the half elliptic spring; a supported body connected at one end with the same end of the half elliptic spring as the resilient arm, and a shackle connecting the short arm of the lever spring with said supported body.

4. The combination with a half elliptic spring, of a lever spring fulcrumed to one end of the half elliptic spring, and having a short and a long arm; the long arm being resilient; a shackle connecting the end of the long arm with the other end of the half elliptic spring; a supported body having a spring member connected at one end with the same end of the half elliptic spring as the resilient arm, and a shackle connecting the short arm of the lever spring with the spring member of said supported body.

5. The combination with a half-elliptic spring, of a supported body above such spring, a lever spring fulcrumed between the half-elliptic spring and the supported body to resist approach and separation of said half-elliptic spring and said supported body, and a duplex bumper for contact with the lever spring at parts of the approaching and separating movements of the supported body and half-elliptic spring and means to adjust the bumper to limit said movements.

6. The combination with a half elliptic spring, of a lever spring fulcrumed to one end of the half elliptic spring, and having a short and a long arm; the long arm being resilient; a shackle connecting the end of the long arm with the other end of the half elliptic spring; a second half elliptic spring connected at one end with the same end of the half elliptic spring as the resilient arm, a shackle connecting the short arm of the lever spring with the other end of the second half elliptic spring, and a duplex bumper to contact with the long arm at reserve limits of the spring action.

7. The combination with a half elliptic spring, of a lever spring fulcrumed to one end of the half elliptic spring, and having a short and a long arm; the long arm being resilient; a shackle connecting the end of the long arm with the other end of the half elliptic spring; a supported body connected at one end with the same end of the half elliptic spring as the resilient arm; a shackle connecting the short arm of the lever spring with said supported body, and a duplex bumper having an upper and a lower stop to limit the movement of the long arm in both directions.

8. The combination with a half elliptic spring, of a lever spring fulcrumed to one end of the half elliptic spring and having a resilient arm; a shackle connecting the end of the resilient arm with the other end of the half elliptic spring. a supported body connected at one end with the same end of the half elliptic spring is the resilient arm, a shackle connecting the other arm of the lever spring with said supported body, and a duplex bumper having an upper stop and a lower stop to alternately contact with the resilient arm when the arm bends upward and downward respectively.

9. The combination with two spaced apart bodies and a lever spring attached to one of said bodies and fulcrumed to the other body, of adjustably mounted stops above and below the spring lever respectively adapted to alternately contact the spring lever when said bodies are moved toward and from one another.

10. The combination with two bodies and a lever spring to hold them apart, of two hangers provided with holes and fastened to one of said bodies; said lever spring being between the hangers, and bolts adjustable toward and from each other in the holes on opposite sides of the lever spring.

11. The combination with two bodies and a lever spring to hold them apart, of two hangers provided with holes and fastened to one of said bodies; said lever spring being between the hangers, bolts relatively adjustable in the holes on opposite sides of the lever spring, and resilient sleeves around the bolts.

In testimony whereof, we have hereunto set our hands at Cambria, California, this 13th day of September 1911.

PERCIVAL L. ROOKLEDGE.
G. W. GILLESPIE.

In presence of—
G. C. GISIN,
WM. LEFFINGWELL.